Patented Mar. 17, 1931

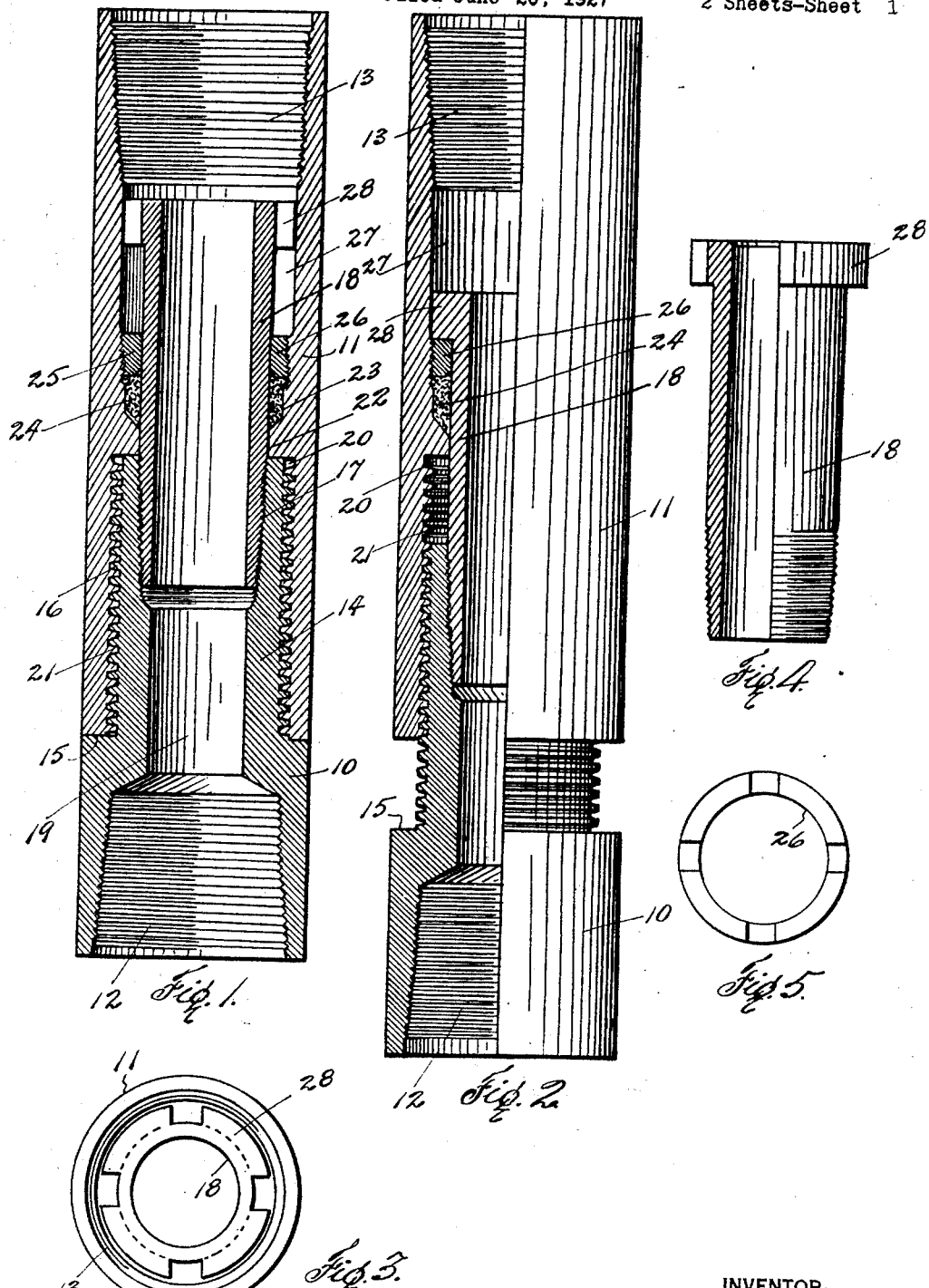

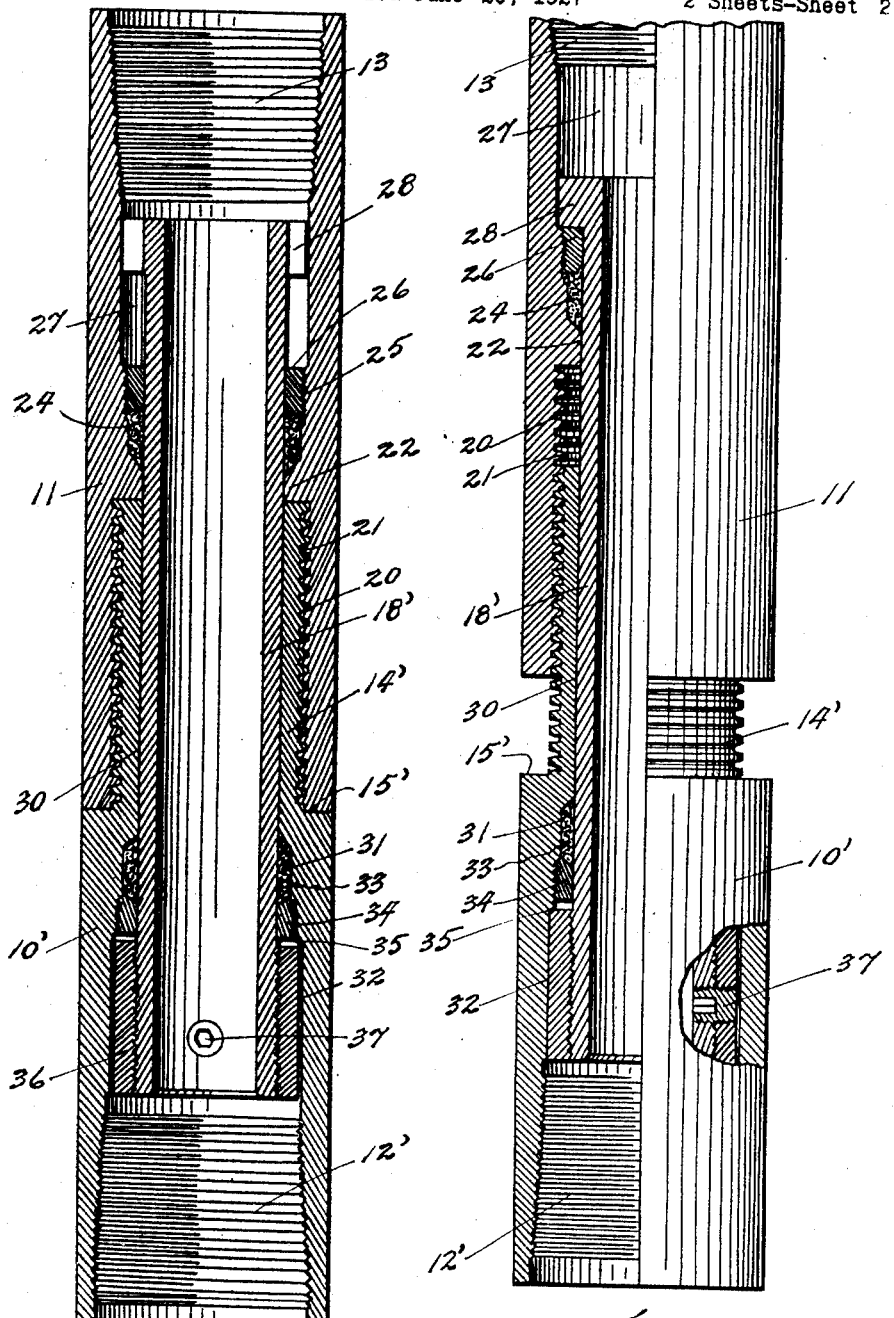

1,796,611

UNITED STATES PATENT OFFICE

GUSTAVUS A. MONTGOMERY, OF DALLAS, TEXAS

UNSCREWING PREVENTER

Application filed June 20, 1927. Serial No. 199,920.

This invention relates to new and useful improvements in unscrewing preventers for rotary drill stems and the like.

The object of the invention is to provide means in the form of a joint which may be inserted in the drill stem and arranged so as to offer less resistance to unscrewing than any other joint or connection in the drill stem, whereby upon a reverse rotation of the stem the preventer will begin to unscrew and thus take up the back-lash or reverse rotation of said stem.

A particular object of the invention is to so arrange the device that fluid leaks will be substantially avoided in all positions of the members constituting the same.

Another object of the invention is to arrange the device so that its threaded portions will remain in mesh and finally cease relative rotation with enough threads meshed to carry the maximum vertical load on the drill pipe, as well as to permit reverse rotation of the drill pipe to unscrew it from a drill bit which has become stuck in the hole.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a device constructed in accordance with the invention and being shown with its members screwed together.

Fig. 2 is a view partly in elevation and partly in section and showing the members in their unscrewed position, Fig. 3 is a plan view of the same, Fig. 4 is a detail of the coupling sleeve, Fig. 5 is a plan view of the gland nut, Fig. 6 is a vertical section showing a modified form, the members being screwed together, and Fig. 7 is a similar view, the members being unscrewed.

In the drawings the numeral 10 designates a male member and 11 a female member. The male member 10 has a tapered internally screw-threaded box 12 in its lower end for receiving the end of a section of tubing or pipe; while the member 11 has a similar box 13 at its upper end. Both members are tubular.

The male member 10 has a reduced cylindrical pin 14 surrounded at its base by an annular flat shoulder 15 and extending upwardly from said shoulder. The pin is provided with coarse screw threads 16, which are much coarser than the threads of the boxes. In the upper end of the pin is an axial tapered socket 17 having fine threads for receiving the lower threaded end of a coupling sleeve 18. An axial bore 19 extends through the member 10 from the box 12 to the socket 17.

The female member 11 has a cylindrical socket 20 extending upwardly from its lower end and provided with internal threads 21 complementary to the threads 16. An annular boss 22 is provided at the top of the socket. When the pin 14 is screwed into the socket 20, the shoulder 15 engages the lower end of the said socket and thus seals the joint.

The sleeve 18 is passed down through the boss 22 and screwed into the socket 17, the sleeve having a turning fit in the boss. An annular packing seat 23 is formed just above the boss and a packing 24 therein embraces the sleeve 18. A gland nut 26 is threaded into the upper end of a gland 25 so as to compress the packing. Above the gland a cavity or chamber 27 extends to the socket 13.

It will be seen that an unobstructed fluid passage is formed axially through the device by way of the socket 13, chamber 27, sleeve 18, bore 19, and socket 12. On the upper end of the sleeve 18 is formed a collar 28 and upon relative movement of the members 10 and 11, their separation is limited by the engagement of the collar with the gland nut 26. Assurance against leaking is provided by the packing gland through which the sleeve slides.

The back-lash, which tends to unscrew the joints of a rotary drill stem, is caused by a sudden release of the torque stresses stored in the drill stem, within its elastic limit. This stress varies greatly from practically nothing to a maximum elastic limit of the weakest section of drill stem and is proportional to the torque exerted by the rotary machine on the grief-bar, and the resistance offered by earth formations to the cutting by the boring tool, of whatever form they may be. If the earth resistance exactly equals the torsional force on the grief-bar, the rotary machine stops rotating, but the stress remains on the stem. If the earth hold on the boring tool, at the lower end of the drill stem, is suddenly released, the large torque stress in the drill stem is set free to seek its equilibrium. This return to equilibrium manifests itself in a violent reverse turning, which is probably greatest at the point where the earth hold on the stem was released, but its effect reaches to every section of the stem below the grief-bar. The reverse turning is often so violent that one or even several of the tool joints in the stem may un-screw and separate, leaving a considerable portion of the sections of the stem in the well bore to be fished out before drilling can proceed.

These difficulties are overcome by the use of my invention and in using the device, several may be inserted in the drill stem at suitable intervals. The threads 16 and 21 of the pin and socket of the male and female members must be of such pitch and character as to unscrew, upon a reverse rotation or back lash of the stem, more readily than any other joint or connection in the said drill stem.

It is important that unscrewing movement be controlled and stopped at a predetermined point, for the reason that the members must not become disconnected and sufficient threads must remain in mesh to carry the suspended load. In Fig. 1 the members 10 and 11 are screwed together as they would under normal drilling conditions.

In Fig. 2 the male member 10 has unscrewed from the female member 11 to its limit, which is defined by the engagement of the collar 28 with the gland nut 26. The sleeve 18 is given sufficient length above the gland nut to permit ample rotations of the pin 14 to take up the back-lash or reverse rotation, by the time the collar engages the nut. Fig. 2 shows the pin unscrewed to its limit yet sufficient threads remain in mesh to carry the load.

An important feature is that by reason of the packing gland the unscrewing of the members will not interfere with or in any way affect the hydraulic pressure of the fluid passing through the device. The threads 16 and 21 are preferably made coarser than the other threads in the drill stem and have a relatively loose fit to induce unscrewing.

However, due to the engagement of the shoulder 15 with the lower edge of the female member, the device will have an efficient right hand or drill capacity and will also have an efficient left-hand driving capacity, when the collar 28 is in engagement with the nut 26.

In Figs. 6 and 7 is shown a modified form which is substantially like the first form except as to the male member and the coupling sleeve. The male member 10′ has a socket 12′, a pin 14′ and a shoulder 15′, similar to the corresponding parts of the male member 10. Instead of the sleeve 18 screwed into the socket 17, an elongated sleeve 18′ is employed having the same collar 28 at its upper end and sliding through the boss 22 and packing 24.

The male member 10′ has an axial bore 30 extending down through the pin 14′ to a packing gland 31 at the upper end of a counter bore 32. In the gland is a packing ring 33 embracing the sleeve and a nut 34 compressing the packing ring. An annular shoulder 35 is formed at the top of the counter bore 32. An adjustable collar 36 is screw-threaded on the lower end of the sleeve within the bore 32 so as to engage the shoulder 35 when the members are unscrewed as is shown in Fig. 2. The collar 36 is locked by a screw 37.

In this style of device the sleeve cannot become detached from the male member and the additional packing ring assures a fluid-tight connection. When the members are unscrewed to the limit the sleeve and its collars 28 and 36 will help carry the vertical load.

Various changes in the size and shape of the different parts, as well as modifications and alterations, may be made within the scope of the appended claims.

What I claim, is:

1. In a device of the character described, a male member adapted to be attached to one section of a drill stem, a female member adapted to be attached to the correlated section of a drill stem, said members having screw-threaded connection of sufficiently small pitch to provide a rotative drive and prevent unscrewing of one member from the other under axial load and to permit a reverse rotation of the drill stem, but only upon abnormal resistance being offered to one of said members, and means for limiting the unscrewing rotation of the members to a less relative longitudinal movement thereof than the threaded area of the male and female members.

2. In a device of the character described, a male member having screw threads and an axial bore, a female member having internal screw threads receiving the threads of the male member and also having an axial bore, said threads being of sufficiently small pitch to provide a rotative drive in one direction and to prevent unscrewing of one member from the other under axial load and to permit a relative reverse unscrewing movement between the members, a stuffing box at the base of the threaded portion in the female member, and a tubular conductor connecting the bores of the members and passing through the stuffing box with a flange engaging the box to prevent withdrawal, whereby a fluid-tight joint is made.

3. In a device of the character described, a tubular female member having a box at its upper end and an internally screw-threaded socket at its lower end, a tubular male member having a box at its lower end and a screw-threaded pin at its upper end engaged in the socket of the female member, said threads being of sufficiently small pitch to provide a rotative drive in one direction and to prevent unscrewing of one member from the other under axial load and to permit a relative reverse unscrewing movement between the members, and a coupling sleeve attached to the pin of the male member and extending into the female member and having means for engaging in the female member to limit the unscrewing movement of the male member from the female member to an extent less than the threaded area of the latter.

4. In a device of the character described, a tubular female member having a screw-threaded socket, a tubular male member having a screw-threaded pin for engaging in the socket of the female member, said threads being of sufficiently small pitch to provide a rotative drive in one direction and to prevent unscrewing of one member from the other under axial load and to permit a relative reverse unscrewing movement between the members, a coupling sleeve disposed axially within the members and extending from one member to the other member, and means on said sleeve for engaging said members and limiting their longitudinal movement relatively thereof to a partial unthreading at the socket.

5. In a device of the character described, a female member having internal screw threads at its lower portion, a male member having external screw-threads at its upper portion, said threads being of sufficiently small pitch to prevent unscrewing of one member from the other under axial load and to permit a relative reverse unscrewing movement between the members, and means for limiting the unscrewing movement of the male member from the female member to an extent less than the threaded area of the latter, whereby the threaded portions of the members are retained in mesh when partially unscrewed.

6. In a device of the character described, a male member having screw threads and an axial bore, a female member having internal screw threads receiving the threads of the male member and also having an axial bore, said threads being of sufficiently small pitch to provide a rotative drive in one direction and to prevent unscrewing of one member from the other under an axial load and to permit a relative reverse unscrewing movement between the members, a stuffing box at the base of the threaded portion in the female member, and a tubular conductor connecting the bores of the members and passing through the stuffing box, whereby a fluid-tight joint is made, the conductor having a flange engaging the stuffing box to prevent withdrawal of the conductor.

In testimony whereof, I affix my signature.

GUSTAVUS A. MONTGOMERY.